Dec. 8, 1964   D. E. TRUMBULL ETAL   3,160,331
MATERIAL DISPENSING DEVICE INCLUDING A METERING CHAMBER
Filed Sept. 22, 1961   2 Sheets-Sheet 1
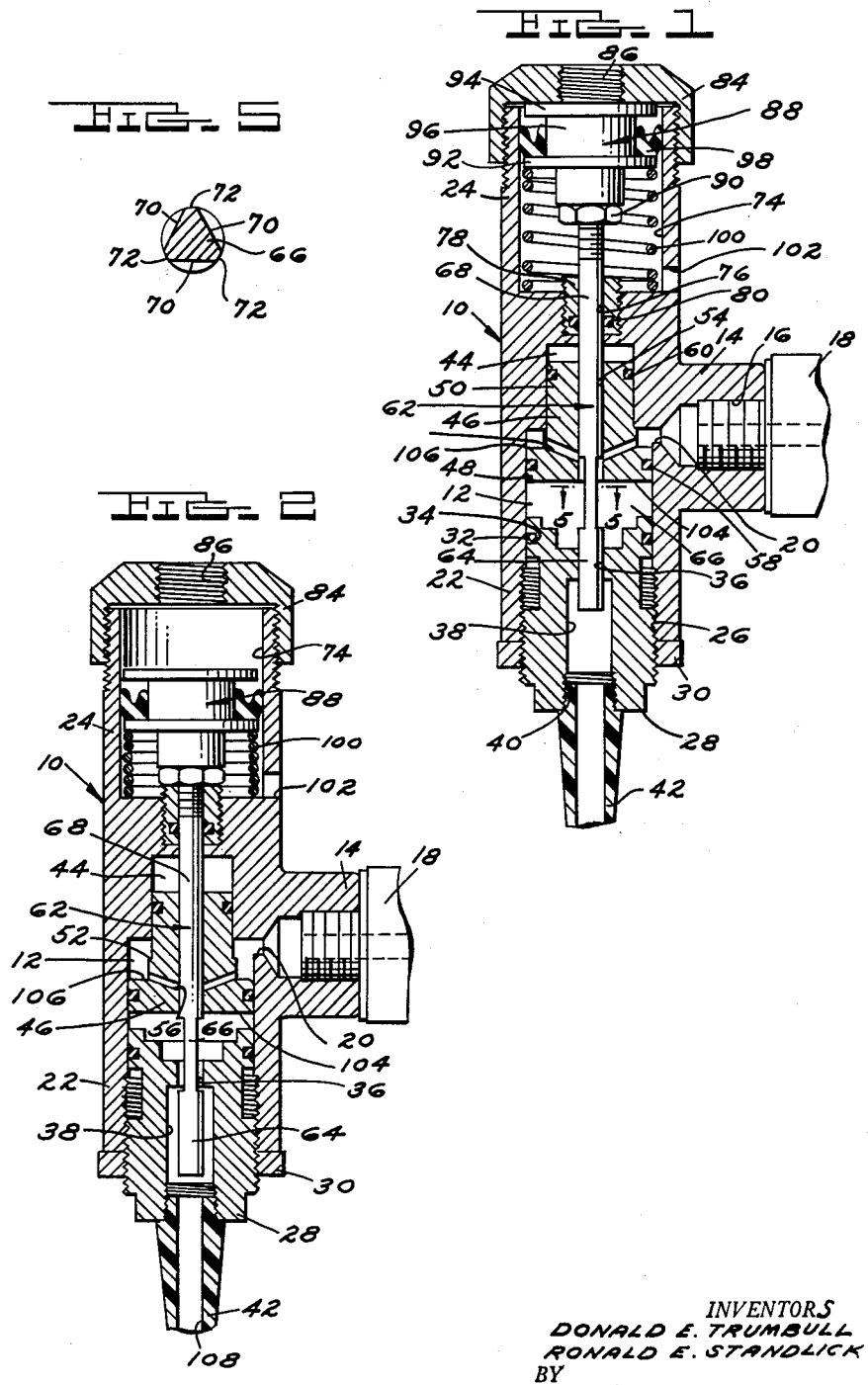
INVENTORS
DONALD E. TRUMBULL
RONALD E. STANDLICK
BY
Burton & Parker
ATTORNEYS

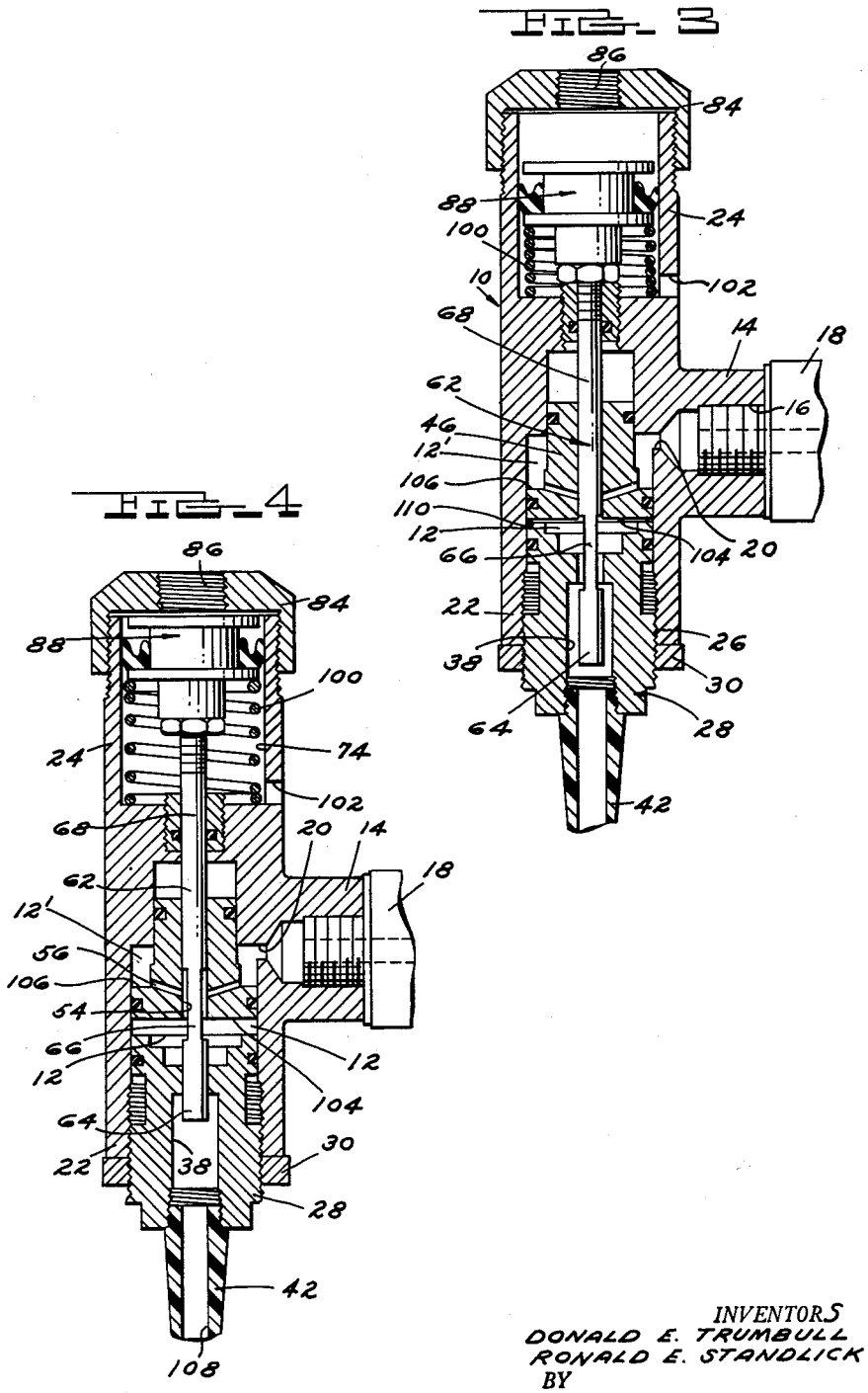

United States Patent Office 3,160,331
Patented Dec. 8, 1964

3,160,331
MATERIAL DISPENSING DEVICE INCLUDING
A METERING CHAMBER
Donald E. Trumbull, Birmingham, and Ronald E. Standlick, Warren, Mich., assignors to Pyles Industries, Inc., Southfield, Mich., a corporation of Michigan
Filed Sept. 22, 1961, Ser. No. 139,940
8 Claims. (Cl. 222—309)

This invention relates to dispensing devices and particularly to a device capable of accurately metering and dispensing discrete amounts of flowable materials. While the device embodying the invention is designed specifically for handling adhesives, sealers, foams and the like commonly known as polyurethanes, polyesters, epoxies, etc., it may be used to meter and dispense any fluid.

These flowable materials generally comprise a base component and a catalyst or accelerator, which must be intimately mixed in accurate proportions before being dispensed. The device of the instant invention may be used to perform the accurate proportioning of the base and catalyst for supply to a mixing apparatus. For example, a pair of the devices could be connected to sources of base and catalyst respectively, and operated to supply each component to a mixer from whence the resulting plural-part material is dispensed to the desired product or location.

In addition, the device has particular utility in operations wherein it is desired to deposit measured amounts of adhesive, sealer or the like to parts for affixing the same together. For this application the devices may be connected to a manifold and located closely together to apply the adhesive or sealer in accurate amounts directly to the desired location.

It is therefore an object of the invention to provide a dispensing device which will accurately meter and dispense discrete amounts of material to any desired product or location.

Another object of the invention is the provision of a dispensing device for accurately metering and dispensing discrete quanta of material under pressure, comprising a metering chamber within which a material piston is shiftably disposed, and wherein the piston is shifted to dispense material from the chamber and to refill the chamber with material by the force of the material under pressure acting against said piston.

A further object of the invention is the provision of a device for metering and dispensing material which device includes a single valve means operable to control both the admission of material under pressure to the device and the dispensing of material therefrom.

Another object of the invention is the provision of a material dispensing device having a metering chamber and including means whereby the effective volume of the chamber may be selectively varied by a simple adjustment, so that the amount of material dispensed during each cycle of operation may be accurately determined.

A specific object of the invention is the provision, in such a dispensing device, of valve means including a portion shiftable into and out of a material discharge passage, said valve portion being retracted from the passage when the outlet of the device is closed, thereby sucking material back from the discharge end and preventing drooling of material from the device when the outlet is closed.

Other objects, advantages and meritorious features will more fully appear from the specification, claims and accompanying drawings, wherein:

FIG. 1 is a cross sectional view of a dispensing device embodying the invention showing the material piston in retracted position and the chamber outlet closed;

FIG. 2 is a cross sectional view similar to FIG. 1 showing the piston during its forward stroke with the chamber outlet open;

FIG. 3 is a view similar to FIGS. 1 and 2 showing the piston in its fully forward position with the outlet remaining open;

FIG. 4 is a view similar to FIGS. 1, 2 and 3 showing the piston during its return stroke with the outlet closed to reload the metering chamber with material; and FIG. 5 is a cross sectional view of the valve element taken along line 5—5 of FIG. 1.

Referring to the drawings, FIGS. 1-4 illustrate a dispensing device embodying the invention in various stages of its cycle of operation. The device comprises a body 10 which defines a metering chamber 12 extending axially of the body. A laterally projecting boss 14 has a threaded portion 16 into which may be threaded a material conducting pressure coupling or the like 18 for supplying material to the chamber 12 through an inlet opening 20.

The body 10 has a forward end 22 and a rear end 24. The forward end exhibits an internally threaded length at 26 threadedly engaged with an outlet retainer member 28. As can be seen from the drawings, member 28 may be adjustably positioned longitudinally in the body 10 by greater or lesser threaded engagement therewith. A lock nut 30 is provided which is threadedly receivable over member 28 and bears against the body to prevent accidental loosening of the retainer member 28. By adjusting the member 28 in the body 10 the volume of the chamber 12 may be varied, and the volume of material dispensed during each operating cycle of the device may thus be varied to suit the particular application. An O-ring seal 32 is disposed in an annular groove 34 about member 28 to prevent material escape from the chamber 12 forwardly thereof.

The retainer 28 has an outlet opening 36 communicating with the chamber 12 through which material is dispensed. Extending outwardly beyond outlet 36 is a passage 38 which is oversize the outlet and has a threaded portion 40 engageable with a dispensing nozzle or the like 42.

The metering chamber 12 communicates with a rearwardly extending bore 44 of lesser diameter than the chamber. The inlet 20 is preferably positioned at the point in the chamber immediately forward of the bore 44. Disposed in the chamber is a material piston 46, having a front portion 48 fitting the bore 44. Spaced rearwardly of the forward portion 48 is an annular shoulder 52 slightly oversize the bore 44, which serves as a stop, assuring that the piston at the rearmost position in its stroke does not obstruct the inlet 20 (see FIG. 1), for purposes more fully described hereinafter.

The piston 46 has an axial bore 54 extending therethrough, and is also provided with a plurality of transverse passageways 56 establishing communication between the inlet 20 and the piston bore 54. The outer end of passageways 56 are preferably located rearwardly of piston portion 48 and with the piston in its retracted position, they are disposed immediately adjacent the inlet, as shown in FIG. 1. The piston 46 is shiftable within the chamber 12 and is provided near opposite ends with O-ring seals 58 and 60 which prevent material by-passing the piston.

A shiftable valve element 62 extends axially through the piston bore 54 and has a forward portion 64, an intermediate portion 66, and a rear portion 68. The forward and rear portions are circular in cross section and are accurately machined to sealingly engage the outlet opening 36 and the piston bore 54 respectively. The intermediate portion 66 is undercut to permit material flow through the outlet 36 when the valve 62 is shifted forwardly as shown in FIGS. 2 and 3. This construction is shown clearly in FIG. 5. The intermediate or flow portion 66 of valve 62 has three flat faces 70 separated by arcuate portions 72. When the valve is shifted, the arcuate portions 72 slide along the wall of outlet 36 and guide the valve in its travel. When the valve is shifted forwardly as in FIGS. 2 and 3, material may flow between the wall of outlet 36 and the faces 70 of the valve element. With this construction the valve 62 is guided in its travel by the contact between the arcuate portions 72 and the wall of outlet 36, preventing any wobble of the valve element as it is shifted back and forth.

The rear end 24 of body 10 defines a fluid pressure chamber 74 into which the rear portion 68 of valve element 62 extends through an aperture 76 in body 10. A stop 78 may be threaded into the body 10 and is provided with a groove in which is disposed an O-ring seal 80 to prevent fluid under pressure from flowing along valve portion 68 into the chamber 12. The rear end 24 of the body is externally threaded as at 82 to receive an internally threaded cap 84 which is provided with a threaded port 86 for connection to a source of fluid under pressure (not shown). A fluid pressure piston 88 is provided and is coupled to the valve element 62 as by being threaded thereon. A stop nut 90 may be provided to prevent loosening of the connection. Piston 88 may be of any suitable construction, and as shown in the drawings may consist of a pair of disks 92 and 94 with a hub portion 96 interposed therebetween. A sealing member 98 surrounds the hub portion and sealingly engages the walls of chamber 74. A coil spring 100 is provided bearing against disk 92, which serves to return the piston to the position retracting the valve element 62 as shown in FIGS. 1 and 4. An exhaust port 102 is provided to prevent pressure build-up in chamber 74 when piston 88 is shifted forwardly. It is obvious that spring 100 may be eliminated and port 102 connected to a source of pressure fluid, and piston 88 could be shifted in both directions by fluid pressure, rather than being returned to its retracted position by spring 100, as shown in the drawings.

*Operation*

With the device coupled to a source of material under pressure (not shown) by means of the fitting 18, the operation of the device is as follows:

Initially the material piston 46 and the valve element 62 are disposed in their retracted positions as shown in FIG. 1, with fluid pressure port 86 on exhaust. In this position forward valve portion 64 blocks outlet 36, and valve portion 66 is disposed opening passages 56 to piston bore 54. Thus material under pressure flows into chamber 12 through inlet 20, passages 56, and piston bore 54. Material also fills the portion of chamber 12 behind the forward portion 48 of the piston. Piston 46 is so constructed that the effective area of the front face 104 of the piston is greater than the effective area of the rear face or shoulder 106. Thus the force exerted by the material will be greater against face 104, and piston 46 will be held in its retracted position, as shown in FIG. 1.

When it is desired to dispense material, fluid pressure is supplied through port 86 against fluid piston 88, shifting valve element 62 to the position shown in FIG. 2. In this position valve portion 66 is disposed opening the outlet 36, and rear valve portion 68 is shifted closing off passageways 56 in the material piston. Material pressure in the chamber 12 is greater than the atmospheric pressure in discharge passage 38, so that immediately upon opening of outlet 36, the material begins flowing through the outlet via passage 38 and aperture 108 in the nozzle 42. This results in a decrease of material force against the forward piston face 104, and as material under pressure is supplied through inlet 20, this pressure acts against piston face 106, and the material piston is forced by the pressure of incoming material toward the outlet, exhausting material from the chamber 12. As can be seen from the drawings, the volume of material dispensed on each forward stroke of piston 46 will be equal to the volume of chamber 12 located forwardly of the piston. This chamber volume may be selectively determined by the amount retainer member 28 is threadedly engaged within the body 10.

The forward travel of the material piston 46 is arrested when it strikes the rear shoulder 110 of the retainer 28, as shown in FIG. 3. In this position material pressure against face 106 of the piston 46 has shifted the same forwardly as far as possible and material under pressure has filled that portion of the material chamber designated by the numeral 12' in FIG. 3. Port 86 is then put on exhaust, and fluid piston 88 is retracted by spring 100 to the position shown in FIG. 4. This shifts valve element 62 to its retracted position, with valve portion 64 closing outlet 36 and valve portion 66 opening passageways 56 to piston bore 54. Material under pressure then may flow through passageways 56 and bore 54 to chamber 12 forward of piston 46 from chamber portion 12' in FIG. 4. It will be noted that inlet 20 is never closed, and thus pressure of incoming material is constantly furnished to the chamber. As shown in FIG. 4, both piston faces 104 and 106 are exposed to the pressure of incoming material. As face 104 is of greater effective area than face 106, the pressure of material forces the piston 46 away from retainer 28, and as the piston retracts material chamber 12 forwardly of the piston is refilled with material. When the piston is again fully retracted, as shown in FIG. 1, the device is ready to be actuated to dispense another measured discrete "shot" or quantum of material.

As shown most clearly in FIGS. 3 and 4, when the valve element 62 is shifted to the position opening outlet 36 (FIG. 3), front valve portion 64 projects into the discharge passage 38, displacing a volume of material from the passage. As valve 62 is shifted to close the outlet 36, valve portion 64 is retracted from discharge passage 38. Thus as portion 64 is withdrawn from passage 38, the effective volume of the passage is increased. As the outlet 36 is now closed, no more material can flow into the passage, and the volume of material in the passage will then be less than the volume of the passage itself. Thus the retraction of portion 64 will suck material inwardly from the nozzle passage 108 toward the outlet opening 36, preventing any drooling of material from the nozzle when the outlet is closed.

From the foregoing description together with the drawings it can be seen that the material piston is shifted in both directions solely by the force of material under pressure acting against the respective faces of the piston. This feature of the device obviates the necessity of having to provide means for shifting the piston to dispense material. The pressurized material connection and the fluid pressure connection to operate the valve element are the only connections required. Both the dispensing and reloading operations are effected by the shifting of the material piston in response to the pressure of incoming material.

In addition, the valve element 62 is so designed as to control both the admission of material to the material chamber and the discharge of material therefrom. The valve element also functions to suck material inwardly of nozzle 42 when the outlet is closed, preventing drooling of material from the device.

What is claimed is:

1. A material dispensing device to which material to be dispensed is supplied under pressure, comprising an enclosed metering chamber having an inlet and an outlet through which material is dispensed, a piston disposed in said chamber and shiftable therein to dispense material through the outlet, valve means controlling the admission of material to the chamber and the discharge of material through said outlet, said valve means selectively operable to alternatively block the flow of material to the chamber while opening said outlet and admit material to the chamber while closing said outlet, said piston responsive to the pressure of incoming material thereagainst to be shifted toward the outlet thereby dispensing material from the chamber when the outlet is open, motive means coupled to said valve means to operate the same, and a material conducting passage communicating with said outlet and extending therebeyond, said valve means including a portion shiftable into said passage upon opening of said outlet and retractable from the passage upon closing of the outlet to increase the effective volume of the passage and prevent drooling of material therefrom when said outlet is closed.

2. A material dispensing device to which material to be dispensed is supplied under pressure, comprising an enclosed metering chamber having an inlet for admitting material under pressure and an outlet through which such material is dispensed, a material piston disposed in said chamber having a front face adjacent said outlet and a rear face adjacent said inlet of lesser effective area than said front face, at least one material passage through said piston establishing communication between said inlet and said outlet, valve means in flow controlling communication with said piston passage and said outlet and shiftable from a position opening said passage and closing said outlet to a position closing said pasage and opening said outlet, and fluid pressure operated means coupled to said valve means to shift the same, said piston responsive to the pressure of material against the rear face thereof to be shifted toward the outlet to dispense material from the chamber upon the shifting of said valve means to the position closing the piston passage and opening the outlet.

3. A material dispensing device to which material to be dispensed is supplied under pressure, comprising an enclosed metering chamber having an inlet for admitting such material and an outlet through which material may be dispensed, a material piston disposed in said chamber having a front face adjacent said outlet and a rear face adjacent said inlet of lesser effective area than said front face, said piston provided with an axial bore therethrough and a plurality of passages establishing communication between the chamber inlet and the piston bore, spool type valve means extending through the piston bore and projecting into said outlet and shiftable from a position opening said piston passages and closing said outlet to a position blocking the passages and opening the outlet, fluid pressure operated means coupled to said valve means for shifting the same, said piston responsive to a decrease in pressure against the forward face thereof upon the shifting of the valve means to the position opening the outlet and closing the passages, to be shifted toward the outlet by the pressure of material against the rear face of the piston, thereby dispensing material from the chamber through the outlet.

4. A material dispensing device to which material to be dispensed is supplied under pressure, comprising an enclosed metering chamber having an inlet for material under pressure and an outlet through which such material is dispensed, a material piston shiftably disposed within the chamber and having a front face adjacent said outlet and a rear face adjacent said inlet, with said rear face of lesser effective area than the front face, said piston having an axial bore extending therethrough and a plurality of substantially transverse apertures in the piston establishing communication between said inlet and said bore, spool type valve means extending axially through the piston bore and shiftable relative to said piston from a position closing said apertures and opening said outlet to a position opening the apertures and closing the outlet, fluid pressure operated means coupled to said valve means to shift the same, said piston responsive to material pressure against the rear face thereof when said apertures are closed and said outlet is open to be shifted in one direction, thereby dispensing material from the chamber, and responsive to material pressure against the front face thereof when said apertures are open and said outlet is closed to be shifted in the opposite direction, thereby admitting material to the chamber.

5. A material dispensing device to which material to be dispensed is supplied under pressure, comprising an enclosed metering chamber having an inlet and an outlet opening therethrough in spaced apart relation, a shiftable piston in said chamber having a surface facing the outlet and a second surface of lesser effective area exposed to pressure of material from said inlet with material passageway means in said piston establishing communication between said inlet and said chamber, shiftable valve means extending between and controlling material flow through said piston passageway means and said outlet, means coupled to said valve means to shift the same between a position blocking said passageway means and opening said outlet and a position opening the passageway means and blocking the outlet, said piston responsive to material pressure against said second surface when the outlet is open to be shifted thereby toward said outlet dispensing material through the outlet.

6. The material dispensing device as defined in claim 5 characterized in that a material discharge passageway communicates with said outlet beyond said metering chamber, and said shiftable valve means includes a portion projecting into said passageway when the outlet is open and retractable from the passageway upon closing the outlet to increase the effective volume of the passageway and thereby prevent drooling of material from the device when the outlet is closed.

7. A material dispensing device to which material to be dispensed is supplied under pressure, comprising an enclosed metering chamber having an inlet for admitting material under pressure and an outlet through which such material is dispensed, a material piston disposed in said chamber and having at least one material passage therethrough establishing communication between said inlet and said outlet, valve means in flow controlling communication with said piston passage and said outlet and shiftable from a position opening the passage and closing said outlet to a position closing the passage and opening the outlet, and actuating means coupled to said valve means to shift the same, said piston responsive to the pressure of material against the inlet facing surface thereof to be shifted toward the outlet to dispense material from the chamber upon the shifting of said valve means to the position opening the outlet.

8. The material dispensing device as defined in claim 7 characterized in that said metering chamber is defined by a cylindrical member having one open end and an end closure member sealingly engaged within such open end, said closure member defining said material outlet and being selectively shiftable axially of the cylindrical member to vary the effective volume of the metering chamber.

References Cited in the file of this patent

UNITED STATES PATENTS

| | | |
|---|---|---|
| 1,313,174 | Eisenhardt | Aug. 12, 1919 |
| 1,764,823 | Bowlus | June 17, 1930 |
| 2,188,676 | Crandall | Jan. 30, 1940 |
| 2,352,490 | Meyers | June 27, 1944 |
| 2,732,854 | George | Jan. 31, 1956 |
| 2,845,081 | George | July 29, 1958 |